United States Patent [19]
Wilson

[11] 4,243,441
[45] Jan. 6, 1981

[54] METHOD FOR METAL STRIP TEMPERATURE CONTROL

[75] Inventor: Walter A. Wilson, Pittsburgh, Pa.

[73] Assignee: National Steel Corporation, Pittsburgh, Pa.

[21] Appl. No.: 37,529

[22] Filed: May 9, 1979

[51] Int. Cl.³ .............................................. C21D 1/26
[52] U.S. Cl. ................................... 148/128; 148/156; 148/153; 432/8; 432/12; 432/24
[58] Field of Search ........................ 148/128, 156, 153; 432/8, 12, 24

[56] References Cited

U.S. PATENT DOCUMENTS

| 3,033,539 | 5/1962 | Cook et al. ........................... 148/128 |
| 3,247,364 | 4/1966 | Waziri ................................. 148/128 |
| 3,496,033 | 2/1970 | Gilbreath et al. ..................... 148/13 |
| 3,533,261 | 10/1970 | Hollander et al. ...................... 72/201 |
| 3,589,160 | 6/1971 | Gruver et al. ......................... 72/201 |
| 3,645,804 | 2/1972 | Ponchel ............................... 148/128 |
| 3,930,900 | 1/1976 | Wilson ................................ 148/12 B |
| 4,047,985 | 9/1977 | Greenberger ......................... 148/153 |
| 4,050,963 | 9/1977 | Kunioka et al. ....................... 148/128 |
| 4,052,235 | 10/1977 | Makaoka et al. ..................... 148/156 |
| 4,090,697 | 5/1978 | Perrine .............................. 266/111 |

*Primary Examiner*—R. L. Andrews
*Attorney, Agent, or Firm*—Shanley, O'Neil and Baker

[57] ABSTRACT

Method and apparatus are disclosed for accurately controlling the temperature of a moving metal strip in a continuous heat treating operation. A plurality of temperature sensors are located at fixed intervals along the path of the metal strip through the heat treating apparatus, e.g., the cooling tunnel following an annealing oven, employed to control the application or extraction of heat and thereby the rate of temperature change of the strip. Errors in sensor readings are compensated by secondary averaging of adjacent temperature differential measurements to provide a more accurate temperature control.

17 Claims, 4 Drawing Figures

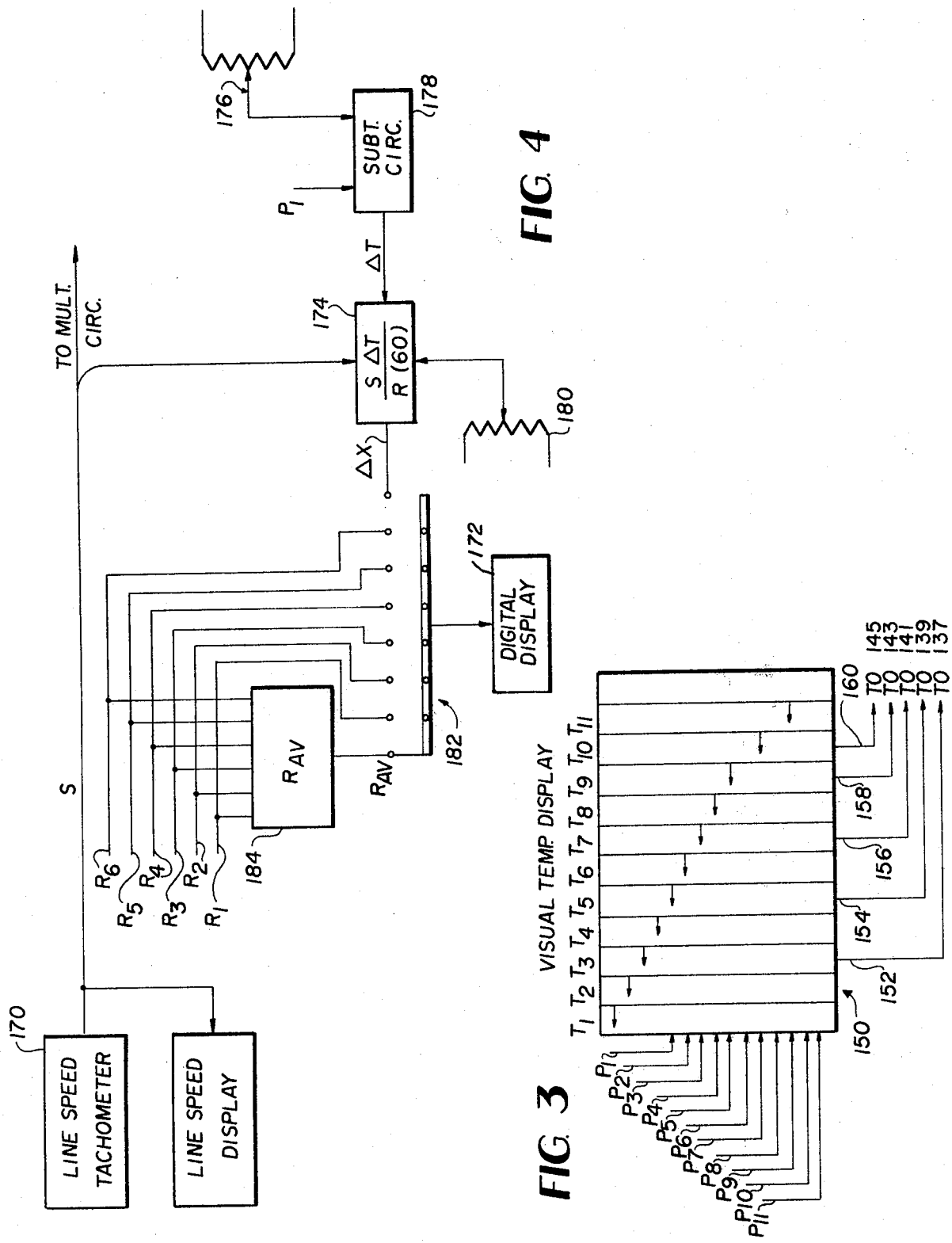

METHOD FOR METAL STRIP TEMPERATURE CONTROL

BACKGROUND OF THE INVENTION

1. Field of the Invention

This invention relates to heat treatment of a metal strip, and particularly to the accurate temperature control of a moving metal strip in a continuous heat treating operation. The invention is especially useful in the production of dual phase steel strip by accurately controlling at the cooling rate of the heated strip following heat treatment in a continuous annealing oven.

2. Description of the Prior Art

In the manufacture of elongated or continuous metal articles such as metal strip, pipe, bars, plate and the like, it is conventional practice to employ controlled cooling at various stages such as during or following annealing or on a run-out table following a hot rolling or other hot forming operation. Various means have been employed to control the cooling rate, including measuring the temperature of the product as it enters the cooling area, determine the total temperature reduction required which, combined with the measured rate of movement through the cooling area, is utilized to determine the total cooling required. Application of cooling fluid is then increased or decreased along the entire cooling area in such a way that the final temperature of the product has always reached the desired lowered temperature regardless of the speed of the product or the temperature entering the cooling zone. This process, however, results in a higher cooling rate with increased product speed and/or increased temperature entering the cooling zone.

It is also known to provide a cooling zone, for example, a run-out table, having a total length greater than normally required to cool a product moving thereon, and to provide a plurality of cooling means located at spaced intervals along the length of the cooling zone. A computer or microprocessor is then used to control the activation and/or deactivation of selected ones of the groups of cooling devices along the length of the cooling zone depending upon measured product speed and the temperature of the product entering the cooling zone. This process, utilizing only a part of the cooling sections, is intended to obtain an approximation of the desired cooling rate, i.e., an average cooling rate for the product during the time required to pass through the cooling zone.

Other known cooling rate control systems have included utilizing a rolling mill control computer, on a time sharing basis, to monitor one or more spray cooling zones and to control the cooling in such zones based upon operating signals from various information sources including measured strip speed, thickness, and initial temperature, and from programmed information relating to desired or fixed data. A variation of this concept is to employ a fixed length of a cooling zone and varying the rate of flow of the cooling fluid in the zone based upon the comparison of measured values such as strip velocity and/or strip discharge temperature with the desired values.

While the known cooling systems have been adequate for cooling hot metals such as low carbon steel, these systems have generally not been capable of controlling the cooling rate with the desired degree of accuracy throughout the cooling zone where accurate control of the crystalline structure of the product is required. For example, the control of the cooling rate following annealing is critical in the production of the high-strength steel strip having exceptional formability and a ferrite-martensite, dual-phase, microstructure described in pending U.S. patent application Ser. No. 931,684 filed Aug. 7, 1978, now U.S. Pat. No. 4,159,218, assigned to the Assignee of the present invention. Accurate control of the cooling rate within the temperature range between the $A_1$ and $A_3$ transformation points, i.e., within the intercritical temperature range of about 1337° F.–1616° F. (725° C.–880° C.) down to the martensite forming temperature, for example 850° F.±100° F. (454° C.±56° C.) is critical in the production of a high-quality dual-phase strip in accordance with the invention disclosed in that prior application. Further, for the production of such high-quality dual-phase steel strip, it is important that the cooling rate be accurately controlled throughout the critical temperature range within relatively close tolerances. It is, therefore, a primary object of the present invention to provide an improved method of and apparatus for controlling the temperature of a moving product in a continuous heat treatment operation.

Another object of the present invention is to provide an improved method of and apparatus for accurately controlling the cooling rate of a heated metal product moving through a cooling zone.

Another object of the invention is to provide an improved method of and apparatus for accurately controlling the temperature of a continuous length of heated metal moving through a cooling zone to provide a substantially uniform cooling rate throughout the length of the cooling zone.

Another object of the present invention is to provide an improved method of and apparatus for producing a high-strength dual-phase ferrite-martensite steel strip of uniform high quality.

SUMMARY OF THE INVENTION

The foregoing objects and advantages are achieved in accordance with the present invention by utilizing a plurality of temperature sensing devices spaced at fixed intervals along the length of the cooling zone and utilizing the temperature measurements obtained by these sensing devices to accurately control the application of a cooling medium to produce the desired cooling rate throughout the portion of the cooling zone required to produce the desired temperature. A high degree of accuracy is achieved by computing the temperature differential between each pair of adjacent temperature sensing devices, and utilizing secondary temperature differential averaging to minimize the adverse affect of sensor errors which may be produced, for example, by an inaccurate or improperly calibrated sensor. Cooling rate is calculated based upon the measured temperature differential, the distance between temperature sensors, and the rate of movement of the product through the cooling zone, and the application of cooling fluid is adjusted in accordance with the comparison of the calculated cooling rate and the desired or set point cooling rate.

BRIEF DESCRIPTION OF THE DRAWINGS

Other features and advantages of the invention will become apparent from the detailed description contained hereinbelow, taken in conjunction with the drawings, in which:

FIG. 3 is a schematic representation of a temperature display panel employed in the system of FIG. 1; and, FIG. 4 is a schematic representation of a control panel display employed in the system.

DESCRIPTION OF THE PREPARED EMBODIMENT

Figure 1:
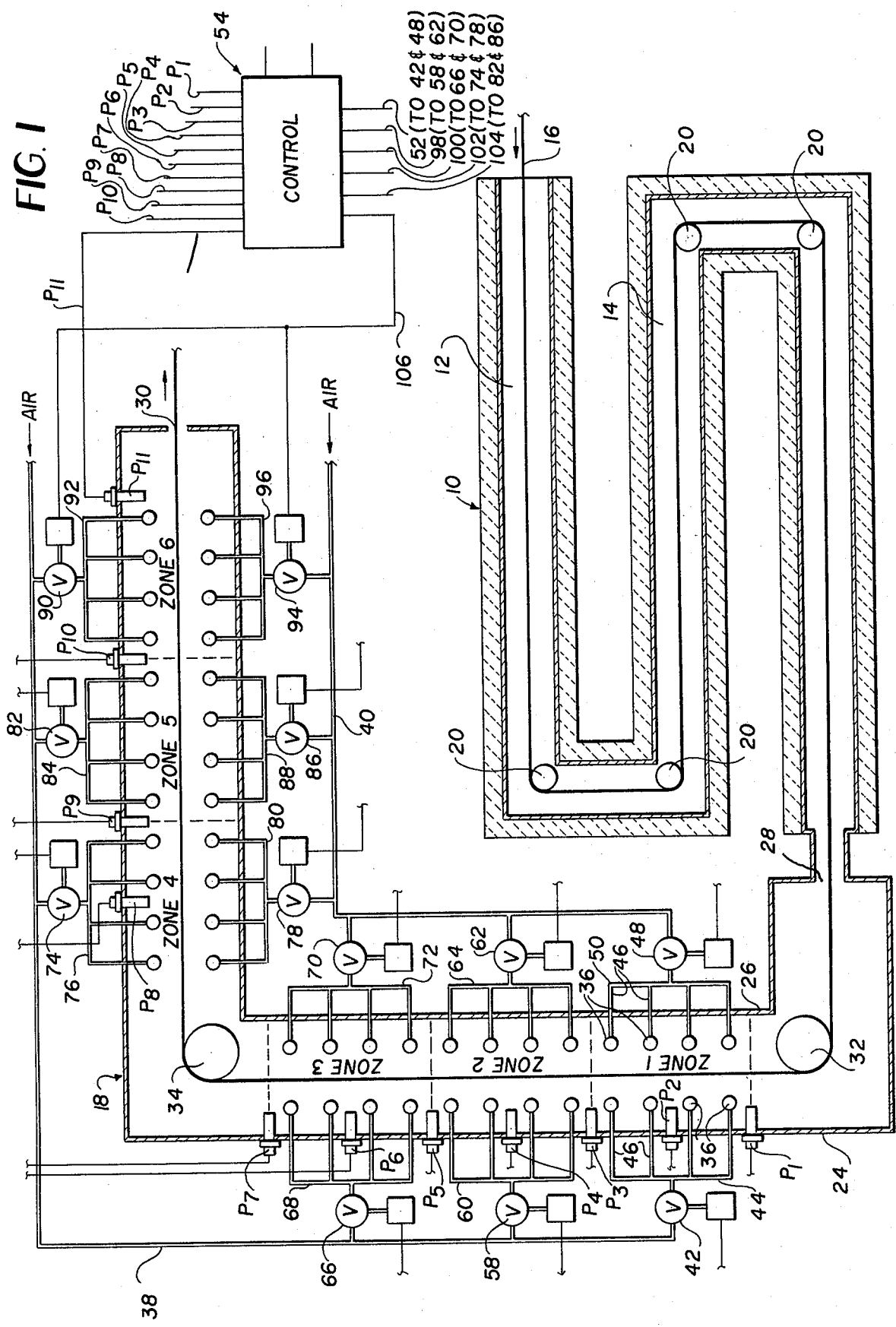
FIG. 1 is a schematic representation of a system for continuously annealing and subsequently cooling strip steel, with the system embodying the temperature control means according to the present invention.

Referring now to the drawings, a conventional continuous strip annealing oven 10 is schematically illustrated in FIG. 1 as including a heating chamber 12 and a somewhat longer holding or soaking chamber 14. Suitable heating elements, not shown, and temperature controls, also not shown, are of course provided in both the heating chamber 12 and the holding chamber 14 so that a metal strip 16, e.g., a steel strip, being annealed can be quickly brought to the desired temperature, then held at that temperature for the desired length of time before being discharged from the holding chamber into a cooling chamber designated generally by the referenced numeral 18.

As depicted in FIG. 1, the annealing oven 10 is in the form of an elongated tunnel folded upon itself to provide a plurality of a vertically spaced, generally horizontal runs, with strip 16 being guided about the folded path by a plurality of guide rolls 20. While other configurations, including a continuous straight tunnel, may be employed, this folded arrangement provides a convenient means of conserving floor space in the heat treating area of a mill. Similarly, the cooling chamber 18 is in the form of an elongated tunnel including a vertical section extending upwardly at the exit end of the annealing oven and a horizontal section extending in vertically spaced relation above the top of the annealing oven, again for the purpose of conserving floor space in the mill.

The cooling chamber 18 is generally rectangular in cross-section and defined by spaced walls 24, 26 located on opposed sides of the strip 16 passing therethrough, with side walls, not shown, cooperating with walls 24, 26 to define a substantially closed, elongated tunnel having an entrance at 28 connected to the exit of the annealing oven 10 and an exit at its opposite end through which the strip passes to be further processed as by winding into a coil or the like.

The heated strip 16 emerges from the annealing oven and is guided through the elongated cooling tunnel in substantially equally spaced relation to the opposed walls 24, 26 by guide rolls 32, 34. A plurality of cooling fluid discharge nozzles 36 are mounted within the cooling tunnel on each side of the strip 16, with the nozzles being spaced substantially along the length of the tunnel. The nozzles 36 are arranged in groups to provide separately controlled cooling zones along the length of the cooling tunnel. Thus, in FIG. 1, the cooling nozzles on each side of the strip moving through the tunnel are arranged in groups of four nozzles each, with the individual nozzles 36 of each group being connected to a cooling fluid manifold.

The groups of nozzles are arranged in pairs consisting of one group on each side of the strip in substantially opposed relation to one another, with each pair defining a separately controlled cooling zone within the tunnel.

In FIG. 1, six separate cooling zones are illustrated, though it is understood that a greater or lesser number of cooling zones might be utilized and that more or less individual cooling fluid nozzles might be arranged in each group, as desired, to provide the uniform cooling rate. In this regard, while the nozzles 36 are schematically illustrated as circles, in practice these nozzles can be in the form of an elongated conduit extending transversely of the direction of movement of the strip through the cooling tunnel, with fluid discharge means in the form of a plurality of individual openings or an elongated slot formed in the conduit to direct cooling fluid onto the surface of the strips essentially across its full width as the strip moves past each nozzle.

A cooling fluid supply pipe 38 extends along the length of the cooling chamber adjacent and outboard of the wall 24 and a second supply pipe 40 extends along wall 26 to supply cooling fluid, for example, cooling air, to the nozzles 36. The individual cooling fluid discharge nozzles 36 in each group of nozzles are connected to a manifold which, in turn, is connected through a motor-actuated control valve to the cooling fluid supply conduit on the respective sides of the cooling chamber. Thus, two control valves are employed to control the flow of cooling fluid to each cooling zone, with one valve controlling the flow to the manifold supplying fluid to the group of nozzles on each side of the strip within the zone. The two control valves in each cooling zone are preferably connected in a common control circuit for simultaneous operation in response to a signal from a central control in a manner described more fully hereinbelow.

The temperature of the strip is monitored at spaced intervals throughout the length of the cooling chamber by a plurality of temperature sensors, typically pyrometers, with the output signal of each pyrometer being fed directly to the central control. Thus, in FIG. 1, eleven pyrometers, designated at $P_1$ through $P_{11}$ respectively, are employed to monitor the temperature at different positions along the cooling tunnel. The pyrometers are arranged one at the entrance and one at the exit of each individual cooling zone, and preferably an additional pyrometer is employed at a central location within at least the cooling zones closer to the annealing furnace. Thus, pyrometer $P_1$ is located at the entrance to zone 1, $P_2$ centrally within zone 1, and $P_3$ at the exit of zone 1 which, of course, is also the entrance to zone 2. Pyrometers $P_3$, $P_4$, and $P_5$ monitor the temperature of the entrance, midpoint and exit of zone 2 while pyrometers $P_5$, $P_6$, and $P_7$ monitor the temperature of zone 3 and pyrometers $P_7$, $P_8$, and $P_9$ monitor the temperature in zone 4. Pyrometers $P_9$ and $P_{10}$, located at the entrance and exit respectively of zone 5 monitor the temperature in zone 5 while pyrometers $P_{10}$ and $P_{11}$ monitor the temperature at the entrance and exit at zone 6. Thus, the temperature drop through each cooling zone is monitored, and this temperature drop is employed by the central control to control the rate of application of cooling fluid within the respective zones.

In cooling zone 1, control valve 42 controls the flow of cooling fluid to manifold 44 which supplies cooling fluid, through connector lines 46, to the individual nozzles 36 on one side of the strip, while, on the other side of the strip, valve 48 controls the flow of cooling air from conduit 40 to manifold 50 which, in turn, supplies cooling fluid through connector lines 46 to the nozzles 36 on that side of the strip. Valves 42 and 48 are connected, through a common line 52, to the main control 54.

In cooling zone 2, valve 58 controls the flow of cooling fluid from conduit 38 to the manifold 60 and the connecting lines 46 to the nozzles 36 on the first side of the strip and valve 62 controls the flow of cooling fluid from conduit 40 to the manifold 64 which supplies the cooling fluid through connecting lines 46 to the nozzles 36 on the other side of the strip. In zone 3, valve 66 controls the flow of cooling fluid from conduit 38 through manifold 68 from which it flows through the connecting lines 46 to the nozzles 36 on the first side of the strip and valve 70 controls the flow from conduit 40 to manifold 72 are discharged through the nozzles 36 on the second side of the strip.

Valve 74 controls the flow from conduit 38 to manifold 76 on the first side of the strip in zone 4 while valve 78 controls the flow from conduit 40 to the manifold 80 on the second side of the strip. In zone 5, valve 82 and manifold 84 are in full connection with the conduit 38 while valve 86 and manifold 88 are in connection with conduit 40, and in cooling zone 6, valve 90 and manifold 92 are in connection with conduit 38 and valve 94 and manifold 96 are in connection with conduit 40. Line 98 from control 54 is connected to and controls operation of valves 58 and 62 in cooling zone 2, while line 100 is connected to and controls valve 66 and 70 in cooling zone 3. Line 102 similarly controls valves 74 and 78 in cooling zone 4, line 104 controls valves 82 and 86 in cooling zone 5, and line 106 controls valves 90 and 94 in the cooling zone 6. Pyrometers $P_1$ through $P_{11}$, respectively, are connected to central control 54 through lines 108, 109, 110, 111, 112, 113, 114, 115, 116, 117 and 118 respectively.

Figure 2:
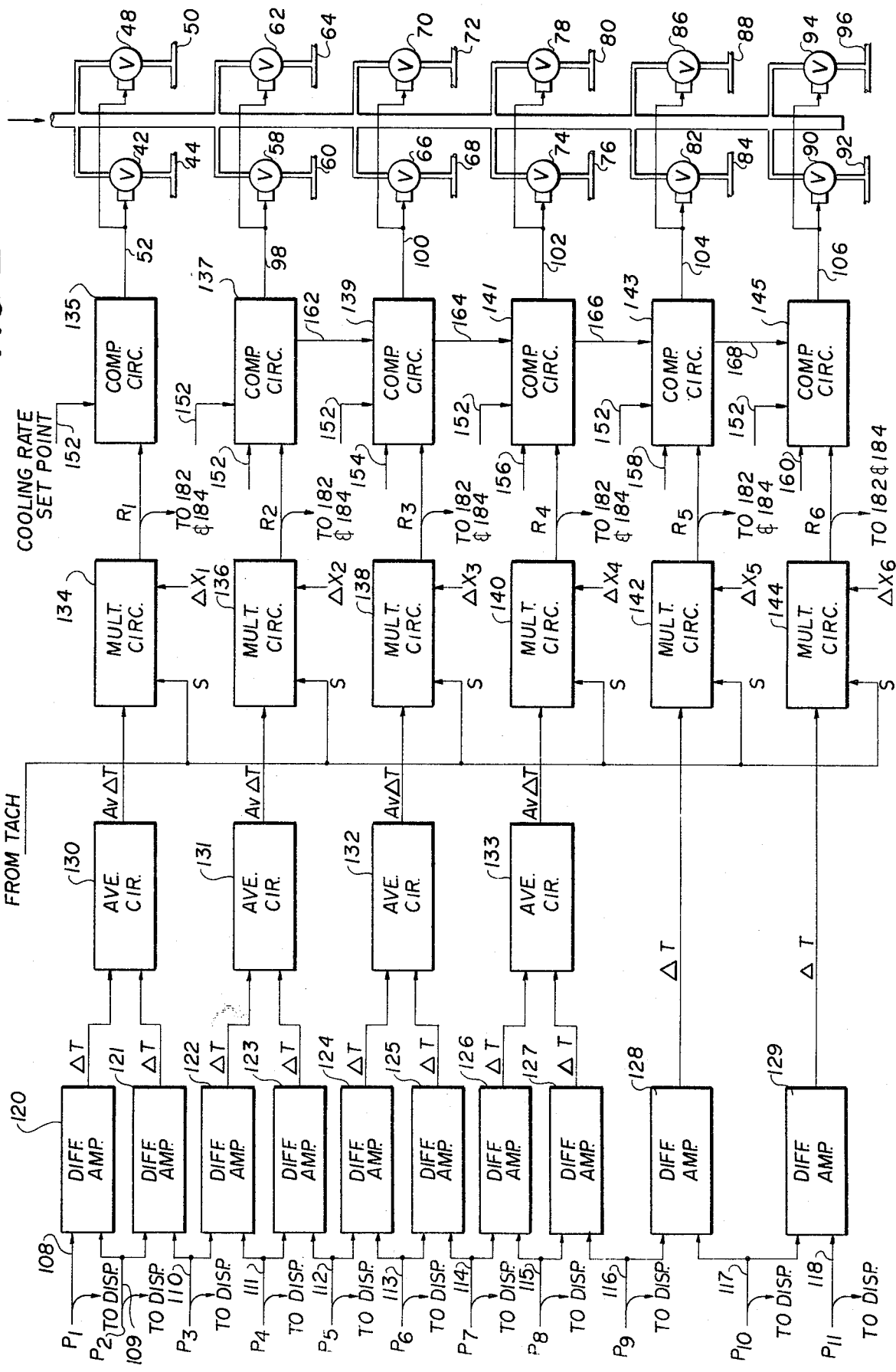
FIG. 2 is a schematic representation of the electronic temperature control system according to the invention.

In accordance with the present invention, the application of the cooling fluid is controlled throughout the cooling chamber, or throughout that portion required to achieve the desired degree of cooling, in order to produce a substantially uniform temperature change rate, which rate is predetermined to produce the desired properties in the metal strip being cooled. To this end, the temperature change between adjacent temperature sensing pyrometers is determined throughout the cooling chamber, and this temperature differential is employed to control the amplification of cooling fluid within the separate cooling zones in the chamber. As shown in FIG. 2, the control mechanism includes a plurality of differential amplifier circuits, with the respective amplifier circuits being designated schematically at 120, 121, 122, 123, 124, 125, 126, 127, and 129. The electrical signal from the temperature sensing pyrometer $P_1$ located at the entrance to cooling zone 1 and from pyrometer $P_2$ located centrally within cooling zone 1 are connected, through lines 108 and 109, respectively, to differential amplifier 120. The signal from pyrometer $P_2$ is also fed to differential amplifier circuit 121, as is the signal from pyrometer $P_3$ located at the downstream extremity of cooling zone 1. The signal from $P_3$ also represents the temperature at the entrance, or upstream extremity of cooling zone 2, and is fed to differential amplifier circuit 122. Similarly, the signals from pyrometers $P_4$ through $P_{10}$, respectively, are each fed to two differential amplifier circuits while the signal from pyrometer $P_{11}$ is fed only to differential amplifier circuit 129.

The signals from each adjacent pair of pyrometers are fed to separate differential amplifying circuits which produce signals $\Delta T$ proportional to the difference in the electrical signals from the pyrometers connected thereto, which signals are, therefore, proportional to the difference in temperature measured by each adjacent pair of pyrometers. In FIG. 2, the signal produced by differential amplifier 120 thus represents the temperature drop during travel of the heated strip from pyrometer $P_1$ to pyrometer $P_2$, or approximately one-half the distance through cooling zone 1. Similarly, the signal produced by differential amplifying circuit 121 is proportional to the temperature drop in the strip while moving through the second half of the cooling zone pyrometer $P_2$ to pyrometer $P_3$. However, the cooling fluid flow rate is substantially uniform throughout zone 1 since the flow is controlled by the valves 42 and 48, connected to manifolds supplying cooling fluid to the nozzles spaced along the full length of the cooling zone.

Although cooling in each zone is controlled in response to the total temperature drop in the strip passing through the zone, the third pyrometer located centrally within each of cooling zones 1 through 4, is provided to minimize any adverse effect of an erroneous reading by any individual pyrometer. This is accomplished by feeding the signals from the differential amplifier circuits receiving signals from the pyrometers from each of cooling zones 1 through 4 to an averaging circuit which produces an output signal $Av.\Delta T$ corresponding to the average measured Temperature drop through the two half-portions of the respective zones. Thus, in the control system of FIG. 2, four averaging circuits 130, 131, 132, and 133 are shown, with averaging circuit 130 receiving the output signals from differential amplifier circuits 120 and 121, averaging circuit 131 receiving the output signals from differential amplifying circuits 122, 123, averaging circuit 131 receiving the output signals from differential amplifier circuits 124 and 125, and averaging circuit 133 receiving the output signals from differential amplifying circuits 126 and 127.

The signal produced by the respective averaging circuits are fed to multiplying, or calculating circuits which utilize the determined temperature drop across the respective cooling zone to calculate the cooling rate. Signals proportional to the strip speed and to the length, in feet, of the cooling zone are fed to the multiplying circuit which performs, electronically, the function of solving the equation $R=[S\Delta T]/[\Delta X(60)]$, wherein R is the cooling rate, S is the strip speed in feet per minute, $\Delta T$ is the temperature change, in degrees, through the involved cooling zone, as determined by the averaging circuit for that zone, and $\Delta X$ is the distance, in feet, between successive pyrometers or sensors. The determined cooling rate R is represented by an output signal from the multiplying circuit which is proportional to the temperature change per unit of time for a particular point on the strip moving through the cooling zone, for example, the temperature drop in degrees Fahrenheit per second.

The cooling rate signal for the respective cooling zones are fed to suitable controllers containing a comparator circuit having a set point input which may be adjusted to the desired cooling rate. The controllers compare the calculated cooling rates with the set point cooling rates and, when the difference between the two exceeds a predetermined amount, produces a signal to operate the control valve to adjust the rate of flow of cooling fluid within the cooling zone involved to make any necessary adjustments to produce the desired cooling rate and to bring the actual, or measured cooling rate back into agreement with the set point cooling rate.

The strip speed is normally determined by the bridle arrangement controlling the feed of the strip through the heat treating apparatus. The bridle includes a tachometer to measure the actual strip speed which is displayed at a control panel; thus, conventional equipment, forming no part of the present invention, can be employed to provide the strip speed signal to the multiplier circuit. The control length signal $\Delta X$ for each cooling zone is fixed at the time of installation of the apparatus so that this signal remains constant for each cooling zone and can be set by feeding a constant signal to the multiplying circuit in known manner.

It is pointed out that the various components of the control circuit thus far described, including the pyrometers, differential amplifiers, averaging circuit components, calculators or multiplying circuit components, and the comparator or controller circuits are well known and can be purchased as commercially manufactured and stocked shelf items. For example, the comparator or controller circuits may be contained in an L&N Model 440 process controller manufactured by Leeds & Northrup Corp. Similarly, the differential amplifying, averaging and multiplying functions may be prepared by an appropriately programmed microprocessor.

Referring now to FIG. 2, the temperature change signal $Av.\Delta T$ from averaging circuit 130 is fed to calculator 134 which calculates the rate of cooling in zone 1, with the calculated rate being fed, as an electrical signal, to controller 135 which controls operation of valves 42 and 48 through line 52. Similarly, in zone 2, the temperature change signal from averaging circuit 131 is fed to multiplier circuit 136 which determines the cooling rate in the zone and provides a signal to controller 137 which is operatively connected to valves 58 and 62 through line 98. The signal from averaging circuit 132 representing the change in temperature in cooling zone 3 is fed to the multiplier circuit 138 which computes the rate of change in this third cooling zone with the rate being fed as an electrical signal to the controller 139 connected to valves 66 and 70 of the temperature change signal from averaging circuit 133 is fed multiplier circuit 140 which computes the cooling rate in zone 4 and directs an electrical signal to controller 141 which controls the position of valves 74 and 78 through line 102.

In cooling zone 5, only two pyrometers are illustrated as being used, with the electrical signal from differential amplifier 128 directing a signal proportional to the total change to temperature across this cooling zone to the multiplier circuit 142. The cooling rate in zone 5 is represented by a signal from multiplier circuit 142 to controller 143 which, in turn, controls actuation of valves 82 and 86 through line 104. Similarly, the temperature signal from differential amplifier 129 is fed to multiplier circuit 144 which, in turn, directs an electrical signal proportional to the cooling rate in zone 6 to controller 145 which controls actuation of valves 90 and 94 through line 106. The third pyrometer is omitted from cooling zones 5 and 6 both because the cooling rate is somewhat less critical in the lower temperature ranges and therefore an erroneous signal from a pyrometer would be less detrimental to the overall properties of the finished metal strip, and because of the increased reliability of pyrometers in the lower temperature range. Further, during operation of the system, one or more of the cooling zones at the cooler end of the cooling chamber may be deactivated, i.e., have the valves controlling the flow of cooling fluid therein completely closed, as a result of the temperature of the strip having already reached a predetermined minimum below which the rate of cooling is not critical. For example, in production of the dual-phase steel of the type described in the above-mentioned pending patent application, it has been determined that the cooling rate of the metal at temperatures below about 900° F. is not critical and that the metal can be coiled or otherwise further processed when it is cooled to this temperature without adverse effect on the dual-phase properties of the strip. Means are provided, as described hereinbelow, for closing the cooling fluid control valves in cooling zones downstream of the zone in which such a predetermined minimum temperature is sensed.

As shown in FIG. 3, the signals from the respective pyrometers are also fed to a temperature display panel 150 which provides a visual display of the temperature reading sensed by each of the pyrometers $P_1$ through $P_{11}$. The display 150 employs vertically movable indicators which are connected one to each pyrometer and displaced along a scale in response to temperature changes so that, when a desired uniform cooling rate is sensed, successive indicators connected to pyrometers located equal distances apart will be positioned in a straight line on the display panel thereby facilitating the detection of excessive or insufficient cooling in any zone or an arratic or erroneous output reading from a specific pyrometer. Thus, in FIG. 3, the indicators designating the temperature sensed by pyrometers $P_1$ through $P_9$ are in a straight line having a first slope, while the indicators connected to pyrometers $T_9$, $T_{10}$, and $T_{11}$, which are spaced a greater distance apart, are disposed in a straight line having a second, greater slope.

The temperature display device 150 incorporates a low temperature sensing means which may be selectively set at any temperature below which further cooling is not required. A separate low temperature sensing circuit is connected to the pyrometers from each cooling zone, with the respective low temperature circuits being connected directly to the controller controlling the flow of cooling fluid in adjacent downstream cooling zone. Thus, the low temperature sensing circuit connected to the pyrometers in cooling zone 1 is connected, through line 152, to the controller 137 controlling the flow of cooling fluid in the cooling zone 2. Similarly, the low temperature sensing circuits connected to the pyrometers in cooling zones 2, 3, 4, and 5, respectively, are connected through lines 154, 156, 158, and 160, respectively, to controllers 139, 141, 143, and 145, respectively. Also, controllers 136–140 are connected together, as shown in FIG. 2, so that a low temperature signal received by any controller in the group will be transmitted to all subsequent controllers, i.e., those controllers controlling the cooling zones downstream therefrom. Thus, controller 137 is connected through line 162 to controller 139 which, in turn, is connected to controller 141 through line 164. Similarly, controller 141 is connected to controller 143 through line 166 and controller 143 is connected to controller 145 through line 168. This arrangement assures that, when the temperature of a heated strip passing through the cooling chamber is reduced to a predetermined temperature below which further cooling is not required, a signal transmitted from the temperature display panel 150 to the next appropriate controller will result in the flow of cooling fluid to all remaining downstream cooling zones being shut off. In the case of an L&N Model 440 controller, mentioned above, the low temperature signal from the temperature display panel, and from the controller receiving such a signal to all downstream controllers, may be a constant 4-volt signal which is applied by the controller circuits receiving such a signal to drive the cooling fluid control valves to the fully closed position.

Shown in FIG. 4, a conventional line-speed tachometer 170 is employed to continuously measure the speed of the heated strip entering the cooling chamber, and the output signal from this tachometer is fed directly to a line-speed digital display 172 which provides a continuous visual display of the strip speed. The speed signal is also directed to the multiplier circuits 134, 136, 138, 140, 142, and 144 for use in electrically calculating the cooling rate and in the manner described above. The strip speed is also directed to a calculator, or multiplier circuit 174 which generates a signal proportional to the length of cooling zone which should be required to produce the desired reduction in temperature, based upon a desired cooling rate and the total temperature reduction required. The required temperature reduction is determined by applying the signal from pyrometer $P_1$ at the entrance to the cooling chamber and a signal generated by a manually adjustable low temperature set point device 176 to a subtracting circuit indicated generally at 178. A signal representing the overall or average desired cooling rate is produced by a set point mechanism 180 and fed to a calculator 174, with the strip speed signal S, the total temperature change $\Delta T$ and the desired cooling rate R being combined by calculator 174 to solve the formula $\Delta X = (S\Delta T)/(R(60))$ to produce a signal representing the total distance $\Delta X$ theoretically required to cool the strip moving through the cooling tunnel. This desired $\Delta X$ signal is connected to one terminal of a scanning digital display 182 and periodically displayed on a digital read-out. In addition, the signal from each of the multiplying circuits 134, 136, 138, 140, 142, and 144 are connected to separate terminals on the scanning digital display 182, with these signals also being fed to an averaging circuit 194 which produces a signal $R_{av}$ proportional to the average of the respective cooling rates, which signal $R_{av}$ is also connected to a terminal on the scanning digital display. Thus, an operator can readily check the actual average cooling rate, the measured cooling rate within each of the respective cooling zones, and the theoretical distance required to produce the desired cooling based upon the total desired temperature change. The theoretical distance $\Delta X$ can be employed to check operation of the apparatus by mentally comparing the theoretical cooling distance required with the length of the cooling chamber in use at a particular time, i.e., the length which has not been shut down as a result of the low temperature being detected in the manner described above.

The adverse effect of any single erroneous reading is greatly reduced and extremely accurate temperature reduction rate control is achieved by use of multiple temperature measurements across each of a plurality of separately controlled cooling zones, with the signals produced by adjacent measuring devices being combined to produce an electrical signal proportional to the temperature change between the two devices, and by averaging the signals produced from such adjacent pairs of sensing devices within each cooling zone in at least selected ones of the cooling zones. Further, any change in conditions is quickly sensed and automatically compensated for so that a substantially uniform cooling rate is achieved throughout the active portion of the cooling chamber despite any such fluctuations. This results in extremely accurate control of the crystalline structure which is important in the production of dual-phase steel strip of the type described in the above-mentioned co-pending U.S. patent application. It should be pointed out, however, that the cooling control method and apparatus according to the present invention can be employed for controlling the cooling of strips other than such dual-phase steel strip, and indeed the method may also be applied to control uniform heating as well as uniform cooling rates. Thus, while the invention has been described with reference to a system and method for controlling the cooling rate in the production of dual-phase steel, it should be understood that the invention is not so limited but rather that the invention has various other practical applications.

It is also pointed out that, while reference has been made to the ability of the invention to control the transfer of heat to or from the material being heated to produce a substantially uniform or straight-line temperature change rate, both the method and apparatus aspects of the invention may readily be utilized to controllably vary the temperature change rate along the length of the treatment chamber. For example, an increased or decreased temperature change rate may be desired at some point in the controlled treatment chamber to assure that a critical time-temperature relation is avoided or to produce a desired influence on the crystalline structure of the material being treated. Thus, the invention should be understood to relate to the controlled transfer of heat to or from a moving length of material passing through a treatment station or chamber, the specifically described embodiment being by way of example only. Accordingly, while I have disclosed and described a preferred embodiment of my invention, I wish it understood that I do not intend to be restricted solely thereto, but rather that I do intend to include all embodiments thereof which come within the spirit and scope of my invention.

I claim:

1. A process for treating a running length of material by transferring heat to or from the material under controlled conditions, the process comprising,
    moving the material longitudinally through an elongated treatment station including a plurality of contiguous treatment zones,
    sensing the temperature of the moving material at a plurality of sensing points including the entrance and exit of each treatment zone and at least one intermediate point in at least selected ones of the treatment zones,
    comparing the temperature measurements at successive sensing points through the treatment station and generating a temperature change signal proportional to the temperature change between successive sensing points,
    averaging the temperature change signals from each of said selected ones of said treatment zones and generating an average temperature change signal proportional to the average of the temperature change signals from each of said selected ones of said treatment zones, and
    utilizing the average temperature change signal to control the transfer of heat to or from the material moving in that zone.

2. The process as defined in claim 1 further comprising continuously measuring the speed of the material through the treatment station and generating a speed signal proportional to the measured speed, and utilizing said speed signal and said average temperature change signal to determine the temperature change rate in each of said selected ones of said treatment zones.

3. The process as defined in claim 2 further comprising the steps of comparing the measured temperature change rate in each of said selected ones of said treatment zones with a predetermined desired temperature change rate, and controlling the transfer of heat to or from the moving material in such zones in response to detected deviations between such desired and measured rates.

4. The process as defined in claim 3 further comprising comparing the measured temperature at each treatment zone with a predetermined material temperature beyond which further transfer of heat to or from the material is not required, and terminating the transfer of heat to or from the material in all treatment zones subsequent to the zone in which the predetermined material temperature is sensed.

5. The process as defind in claim 4 wherein the material is a running length of hot metal strip and wherein said plurality of contiguous treatment zones are cooling zones wherein heat is extracted from the heated strip of metal material.

6. The process as defined in claim 5 wherein heat is extracted from the hot metal strip by directing a cooling fluid onto the opposed flat surfaces of the strip in a plurality of said contiguous treatment zones to reduce the temperature to a predetermined level, and wherein the step of controlling the transfer of heat to or from the strip comprises simultaneously controlling the flow of cooling fluid directed onto the opposed surfaces of the strip in such cooling zones.

7. The process as defined in claim 1 further comprising comparing the measured temperature at each treatment zone with a predetermined material temperature beyond which further transfer of heat to or from the material is not required, and terminating the transfer of heat to or from the material in all treatment zones subsequent to the zone in which the predetermined material temperature is sensed.

8. The process as defined in claim 1 wherein the material is a running length of hot metal strip and wherein said plurality of contiguous treatment zones are cooling zones wherein heat is extracted from the heated strip of metal material.

9. The process as defined in claim 1 wherein the material is a running length of hot metal strip and wherein said plurality of contiguous treatment zones are cooling zones wherein heat is extracted from the hot metal strip by directing a cooling fluid onto the opposed flat surfaces of the strip in a plurality of said contiguous treatment zones to reduce the temperature to a predetermined level, and wherein the step of controlling the transfer of heat to or from the strip comprises simultaneously controlling the flow of cooling fluid directed onto the opposed surfaces of the strip in such cooling zones.

10. A heat treating process comprising continuously moving a length of metal along a fixed path through an elongated treatment chamber and transferring heat to or from the moving metal at each of a plurality of contiguous treatment zones within the chamber to change the temperature to a predetermined level, continuously measuring the rate of travel of the metal through the chamber and generating an electric speed signal proportional to the measured rate of travel, continuously measuring the temperature of the moving metal at a plurality of fixed sensing points along the treatment chamber including a sensing point located at least at the entrance and exit of each treatment zone within the chamber, producing an electric temperature change signal proportional to the difference between the temperature measurements at successive sensing points, determining the temperature change rate in each such treatment zone utilizing such speed signal and the temperature change signals from successive sensing points in the treatment zone, comparing the determined temperature change rate with a predetermined desired temperature change rate for each such treatment zone, and controlling the transfer of heat to or from the metal in each such treatment zone in response to deviations between the desired temperature change rate and the determined temperature change rate in that treatment zone.

11. The process as defined in claim 10 including measuring the temperature of the moving metal at the entrance, exit, and at least one intermediate sensing point in at least selected ones of such treatment zones, producing a separate temperature change signal proportional to the difference in the temperature measured at successive sensing points in each such selected treatment zone, producing a total temperature change signal proportional to the average of the separate temperature change signals from each such treatment zone, and utilizing such total temperature change signal in determining the temperature change rate in such treatment zones.

12. The process as defined in claim 11 wherein the heat treating process is a continuous annealing process in which a running length of metal strip is initially heated to a predetermined temperature in an annealing oven and thereafter passed through an elongated cooling chamber, and wherein the step of applying a heat-transfer fluid to the moving metal comprises directing cooling air onto the surfaces of the elongated metal strip moving through each treatment zone.

13. The process as defined in claim 12 wherein the step of controlling the application of cooling air to the metal strip comprises simultaneously controlling the flow on both sides of the metal strip in each cooling zone.

14. The process as defined in claim 13 wherein said cooling air is directed onto each surface of the metal strip substantially across its full width and at spaced intervals along the direction of movement of the metal strip from a plurality of cooling air discharge nozzles located in each treatment zone.

15. The process as defined in claim 14 further comprising the steps of sensing the predetermined desired temperature level, and terminating the flow of cooling air onto the metal in all treatment zones downstream of the treatment zone in which the predetermined desired temperature is sensed.

16. The process as defined in claim 11 wherein the step of controlling the transfer of heat to or from the moving metal comprises directing a heat-transfer fluid onto the surface of the metal moving through the separate treatment zones, and controlling the rate of flow of the fluid in each treatment zone.

17. A process as defined in claim 12 wherein the metal is a running length of flat metal strip, and wherein the heat-transfer fluid is directed onto both flat surfaces of the strip within the treatment zones.

* * * * *

UNITED STATES PATENT AND TRADEMARK OFFICE
CERTIFICATE OF CORRECTION

PATENT NO. : 4,243,441
DATED : January 6, 1981
INVENTOR(S) : Walter A. Wilson

It is certified that error appears in the above-identified patent and that said Letters Patent are hereby corrected as shown below:

Col. 3, line 11, "prepared" should be --preferred--.

Col. 7, line 8, "control" should be --cooling zone--;

line 9, "cooling zone" should be --control--.

Col. 14, line 3, "12" should be --16--.

Signed and Sealed this

Ninth Day of June 1981

[SEAL]

Attest:

RENE D. TEGTMEYER

Attesting Officer        Acting Commissioner of Patents and Trademarks